United States Patent [19]

Stephens

[11] Patent Number: 5,427,480
[45] Date of Patent: Jun. 27, 1995

[54] BORING TOOL HAVING AN ADJUSTABLE CUTTER ELEMENT

[75] Inventor: Raymond A. Stephens, Sterling Heights, Mich.

[73] Assignee: Valenite Inc., Madison Heights, Mich.

[21] Appl. No.: 232,884

[22] Filed: Apr. 25, 1994

[51] Int. Cl.⁶ .......................................... B23B 29/034
[52] U.S. Cl. ...................................... 408/168; 408/156; 408/180; 408/188
[58] Field of Search ............... 408/156, 158, 159, 161, 408/168, 171, 180, 187, 188

[56] References Cited

U.S. PATENT DOCUMENTS

| | | | |
|---|---|---|---|
| 3,296,898 | 1/1967 | Osborn, Jr. | 408/156 |
| 3,625,625 | 12/1971 | Van Roojen et al. | 408/158 |
| 4,224,846 | 9/1980 | Eysel et al. | 408/180 |
| 4,773,801 | 9/1988 | Noggle | 409/234 |
| 4,867,619 | 9/1989 | Briggs | 408/168 |
| 4,979,852 | 12/1990 | Noggle | 408/159 |
| 5,193,954 | 3/1993 | Hunt | 409/233 |
| 5,203,856 | 4/1993 | Stephens | 408/159 |

Primary Examiner—Steven C. Bishop
Attorney, Agent, or Firm—John W. Gregg

[57] ABSTRACT

A boring tool is equipped with a radially adjustable clutter element, and a remotely-operated mechanism for adjusting the cutter element between its active and inactive positions. During movement of the tool into a hole in a work piece the adjustable cutter element is inactive; the cutting operation is performed by one or more non-adjustable cutter elements. When the tool holder reaches the limit of its penetration into the work piece the remote adjusting mechanism is operated to move the adjustable cutter element radially outwardly to an active cutting position. During return movement of the holder out of the work piece the adjustable cutter element performs a finish machining operation on the hole surface.

10 Claims, 1 Drawing Sheet

BORING TOOL HAVING AN ADJUSTABLE CUTTER ELEMENT

RELATION TO CO-PENDING PATENT APPLICATION

This application relates to a boring tool designed to perform a similar function to a tool disclosed in copending patent application Ser. No. 08/164,867. The tools of both applications comprise one or more radially adjustable cutter elements, whereby one machining operation can be performed during insertional movement of the tool into a work piece, and a second machining operation can be performed during retractive movement of the tool out of the work piece. Cutter adjustments can be performed while the tool is at the limit of its insertional movement into the work piece, such that the two machining operations are carried out without cutter element interference or the creation of machine marks on the work piece surface.

BACKGROUND AND SUMMARY OF THE INVENTION

This invention relates to a boring tool having at least two cutter elements for achieving separate cutting actions during insertional movements and retractive movements of the tool into or out of a hole in a work piece. During insertional movement of the tool into a hole in a work piece a first one of the cutter elements performs a relatively rough machining operation on the hole surface. During retractive movement of the tool out of the hole, a second cutter element performs a finish cut on the hole surface.

While the tool is at the limit of its insertional movement in the hole in the work piece an adjusting operation is performed, whereby the second cutter element is advanced radially outwardly away from the tool rotational axis. The second cutter element is thus free to perform a machining operation on the hole surface without interference by the first cutter element. During insertional movement of the tool into the hole in the work piece the second cutter element is adjusted radially inwardly so as not to interfere with the cutting action of the first cutter element.

The present invention is preferably embodied as a tool that includes a tool clamping unit constructed as shown in U.S. Pat. No. 5,193,954 issued to Carl Hunt on Mar. 16, 1993. U.S. Pat. No. 5,193,954 discloses a mechanism for releasably clamping a cutter element holder to a cutting machine or spindle. The clamping mechanism includes a support housing having a frusto-conical socket adapted to receive therein a protruding section of the cutting element holder. An elongated, movable, tubular clamping bar is located within the housing for the purpose of moving an array of wedge lock elements outwardly against internal lock surfaces on the protruding section of the cutting element holder, such that the cutting element holder is firmly clamped to the housing. Reverse motion of the tubular clamping bar unlocks the wedge lock elements, so that the cutting element holder can be removed from the housing.

The present invention can be constructed to include a cutter element adjustment structure having mating components carried by the support housing and the cutting element holder. An elongated actuator rod extends within the tubular clamping bar so as to be releasably connectable to a slide element located in the cutting element holder. A transverse (radial) pin extends between the slide element and one of the cutter elements, whereby axial movement of the slide element translates into radial motion of the cutter element.

The cutter element adjustment structure of the present invention is designed to be operated automatically from a remote point within the cutting machine, such that the desired adjustment of the cutter element is achieved quickly by automatic control means at a predetermined point in the cutting cycle, e.g. when the cutter element holder is fully inserted into the hole in the work piece, and prior to retractive movement of the cutter element holder out of the work piece. After the cutter element has been withdrawn from the work piece the adjustment structure is operated to return the adjustable cutter element to a non-interfering position relative to the other cutter element.

A principal object of the invention is to provide a cutter element adjustment means that can be operated remotely and automatically at predetermined points in a hole boring cycle, whereby two separate cutting actions can be performed by different cutter elements while the tool is advancing into the hole and subsequently while the tool is being retracted out of the hole. The adjustment means is designed to achieve a predetermined radial adjustment of the associated cutter element, so as to facilitate the attainment of a precision surface on the work piece hole.

THE DRAWINGS

DESCRIPTION OF A PREFERRED EMBODIMENT OF THE INVENTION

Figures 1, 2, 3, 4:
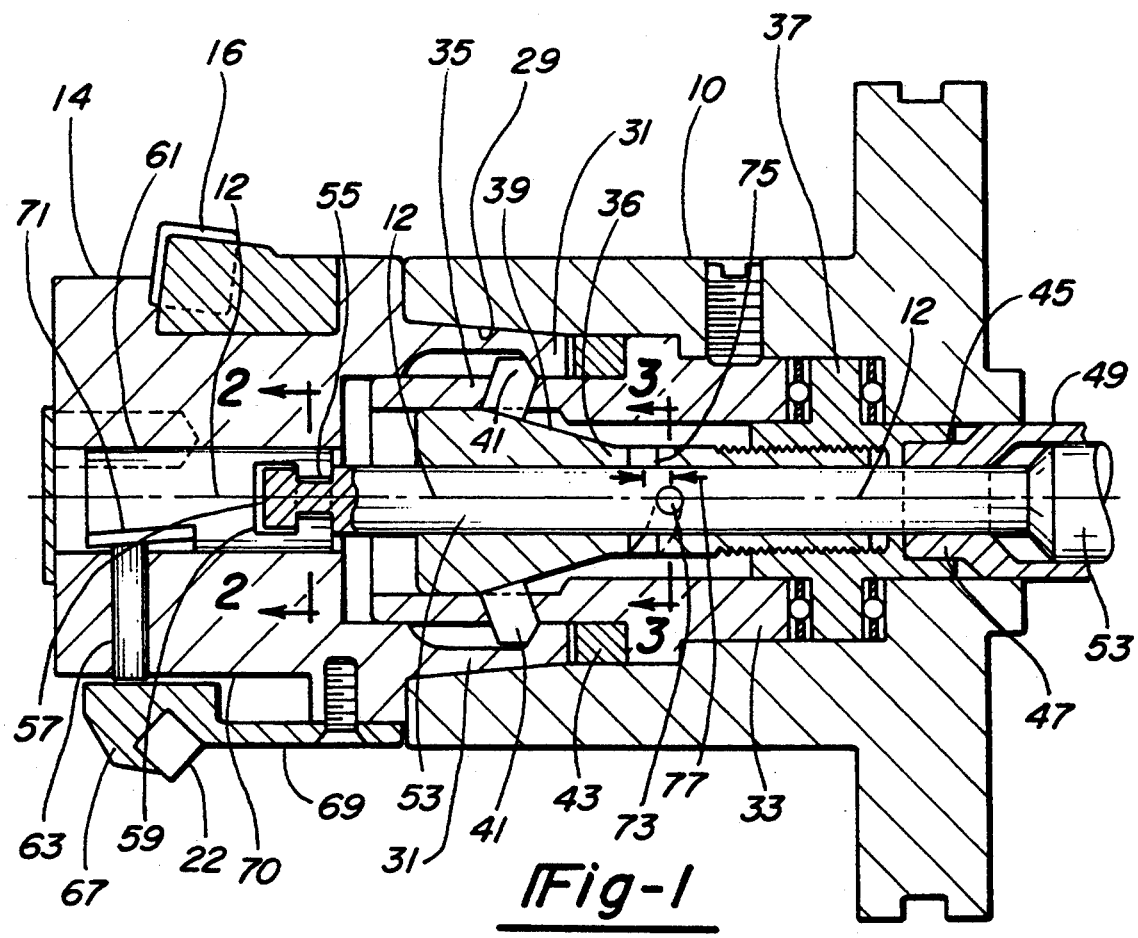
FIG. 1 is a longitudinal sectional view taken through a hole boring tool constructed according to the invention.
FIG. 2 is a fragmentary transverse sectional view taken on line 2—2 in FIG. 1.
FIG. 3 is a fragmentary transverse sectional view taken on line 3—3 in FIG. 1.
FIG. 4 is a left end view of the FIG. 1 tool.

FIG. 1 shows a hole boring tool that includes an annular housing 10 having a longitudinal axis 12. The housing will be mounted in a non-illustrated cutting machine for supporting a cutter element holder 14. As best seen in FIG. 4, the cutter element holder mounts four cutter elements, designated by numeral 16, 18, 20 and 22. Cutter elements 16, 18 and 20 have cutting tips located the same distance from longitudinal axis 12, so that if housing 10 is rotated around axis 12 and advanced axially into a circular hole in a work piece, e.g. an engine cylinder block, the three cutter elements 16, 18 and 20 will cooperatively form a relatively precise circular hole surface having a radius designated by numeral 23. During advancement of housing 10 into the work piece, cutter element 22 is retracted toward the central axis 12, as indicated by numeral 25 in FIG. 4, whereby cutter element 22 is then inactive and non-interfering as regards the cutting action of cutter elements 16, 18 and 20.

When housing 10 has reached the limit of its insertional motion into the work piece, an adjustment structure is actuated to move cutter element 22 radially outwardly to the position shown in FIG. 4. Rotation of housing 10 and axial retractive movement of the housing out of the work piece hole will cause cutter element 22 to machine a hole surface having a radius indicated by numeral 27 (FIG. 4). During this machining operation the three cutter elements 16, 18 and 20 are inactive and non-interfering as regards the cutting action of cutter element 22.

Housing 10 can be a rotating or non-rotating component, depending on the character of the cutting machine and the fixture that mounts the work piece. If housing 10 is a rotating component the work piece will be held in a stationary position. If housing 10 is non-rotating the work piece will be mounted in a rotating fixture. Large size work pieces are usually fixed (non-rotating).

Housing 10 has means therein for releasably clamping the cutter element holder 14 to the housing, while permitting the cutter element holder to be separated (removed) from the housing, when necessary. Such removal of the cutter element holder may be necessary or desirable in order to replace worn cutter elements, or to substitute a different cutter unit that performs a different cutting operation on the work piece, e.g. a counterboring operation or a facing operation.

The means for releasably clamping the cutter element holder 14 to housing 10 is constructed generally similarly to a clamping means shown in U.S. Pat. No. 5,193,954, issued to Carl Hunt on Mar. 16, 1993. Reference may be had to that patent for information on structural details broadly described herein.

Housing 10 has a frusto-conical cavity (or socket) 29 adapted to receive therein an annular protuberance 31 on cutter element holder 14. A sub-housing 33 has a snug press fit within housing 10 so as to form an annular axial surface 35 spaced radially inwardly from frusto-conical socket surface 29. The space circumscribed by sub-housing 33 accommodates an elongated tubular clamping bar 36 that is capable of axial motion; flat side surfaces on the enlarged end portion of bar 36 cooperate with internal flats on sub-housing 33 to prevent bar 36 from rotating.

An internally threaded nut 37 is rotatably mounted in the right end portion of housing 10 for moving bar 36 axially. Bar 36 is shown in a position at the right most limit of its axial motion. Rotation of nut 37 in a given direction will advance tubular bar 36 leftwardly from its illustrated position. As shown in the drawing, flat inclined (sloped) surfaces 39 on the enlarged end of bar 36 are engaged with inner end surfaces of wedge lock elements 41, such that the wedge lock elements are forced radially outwardly against internal conical surfaces on annular protuberance 31.

Each wedge lock element 41 is slidably mounted in a slot in the annular wall of sub-housing 33, such that the wedge lock elements can move into and out of locking engagement with the internal surface of protuberance 31. Any desired number of lock elements 41 can be used. As shown in U.S. Pat. No. 5,193,954, six lock elements are employed.

By way of summarization, axial movement of tubular bar 36 to the FIG. 1 position causes wedge lock elements 41 to be moved outwardly, by cam action, into locking engagement with annular protuberance 31. Leftward axial motion of tubular bar 36 causes wedge lock elements 41 to shift inwardly toward central axis 12, thereby permitting removal of the cutter element holder 14 from the socket defined by frusto-conical surface 29.

To prevent circumferential slippage of the cutter element holder 14 while it is clamped to housing 10, there is provided an annular clutch element 43 screwed or otherwise secured to sub-housing 33. Axial teeth on the clutch element mesh with mating axial teeth on protuberance 31, whereby the cutter element holder 14 is prevented from circumferential slippage when it is clamped to housing 10.

Nut 37 has a hexagonal recess 45 that mates with a hexagonal plug 47 formed on the end of an annular drive member 49; a reversible servo motor, not shown, is associated with drive member 49, whereby nut 37 may be rotated for moving the tubular bar 36 axially, thereby clamping or unclamping the cutter element holder 14, depending on the direction of rotation of the nut. When cutter element holder 14 is unclamped from housing 10 (but still seated in cavity 29) the holder can be removed from the housing by automatic means that comprises three pick up fingers insertable into axial holes 51 in the left end face of holder 14. The pick up system is operable to transfer holder 14 to and from a tool element storage facility remote from housing 10.

The present invention is particularly concerned with novel means for adjusting the position of cutter element 22 when cutter element holder 14 is at the leftward limit of its motion into the hole in the work piece. The novel adjusting means comprises an elongated actuator rod 53 extending through the space formed by tubular clamping bar 36. Bar 36 forms a bearing for the rod.

Rod 53 will be connected at its right end to a power device designed to rotate the rod through a limited arcuate stroke preferably ninety degrees measured around longitudinal axis 12. Various power devices can be used, e.g. a fluid cylinder having a rack-and-pinion drive connection to rod 53 at its right end.

The left end of actuator rod 53 is configured to form a cylindrical neck 55 and a transverse head 57 adapted to fit within a cylindrical chamber 59 formed in the right end portion of a slide element 61. Element 61 can slide a limited axial distance back and forth within an axial slideway in cutter element holder 14; element 61 cannot rotate because of the way that it is connected to a transverse radial force-transmitting pin 63.

Cylindrical chamber 59 communicates with a transverse slot 65 formed in the extreme right end of slide element 61. Slot 65 is demensioned so that head 57 can pass through the slot when actuator rod 53 is rotated ninety degrees from its illustrated position. As shown, head 57 constitutes a detent cooperable with slot 65 to provide an operating connection between actuator rod 53 and slide element 61. When rod 53 is rotated ninety degrees, as indicated by the arrow in FIG. 2, head 57 is aligned with transverse slot 65.

Force transmitting pin 63 has its outer end abutting against the aforementioned cutter element 22. The cutter element comprises an enlarged cutter head 67 and a resilient arm structure 69; the right end portion of arm structure 69 is anchored to holder 14 so that the arm structure can swing around its anchorage point.

In the illustrated position of cutter element 22 its cutter head 67 is spaced a slight distance away from side surface 70 of holder 14; pin 63 exerts a biasing force in opposition to the inwardly directed resilient force of arm structure 69, whereby the cutter element is supported in its operative cutting position.

Slide element 61 carries a flat wear plate 71 that has a slight angulation relative to the slide element axis 12, such that axial motion of the slide element is accompanied by a radial motion of pin 63. Leftward movement of slide element 61 from its FIG. 1 position enables pin 63 to move radially inward under the biasing action of arm structure 69. When head 67 abuts surface 70 of holder 14 the cutter element 22 is in an inactive, non-interfering position.

Actuator rod 53 provides the operating force for moving slide element 61. A pin 73 extends transversely through rod 53 into two curved slots 75 in tubular bar 36. During a one quarter turn of rod 53 pin 73 and slots 75 cooperatively shift rod 53 through a slight distance, represented by arrows 77 in FIG. 1. This axial movement of the rod is transmitted to slide element 61, such that pin 63 is moved radially inwardly, as previously described.

Reverse arcuate motion of rod 53 through a one quarter turn returns the components to the FIG. 1 position. The system is designed so that slide element 61 is shifted to the left when it is desired to deactivate cutter element 22 and break the connection between slide element 61 and actuator rod 53. Slide element 61 is shifted rightwardly to its FIG. 1 position When it is desired to activate cutter element 22, e.g. when holder 14 is at the limit of its penetration into the hole in the work piece. Slots 75 are oriented so that head 57 is maintained in its locking position when cutter element 22 is active.

The invention is concerned primarily with the mechanism for activating and deactivating cutter element 22. As shown in the drawing, the mechanism comprises actuator rod 53, slide element 61, and force-transmitting pin 63. The mechanism is designed to use a relatively long axial stoke of rod 53 for achieving a relatively small radial adjustment of cutter element 22. Small errors in the stroke distance have negligible effect on the adjustment action.

The adjusting mechanism is built into the system used for releasably mounting the cutter element holder 14. Accordingly, the adjustment mechanism can be operated automatically as part of the normal machining cycle.

What is claimed is:

1. A boring bar comprising a clamping bar having a longitudinal axis; a cutter holding means moveable into axial alignment with said clamping bar, whereby the bar then supports said holding means in a cutting position; a first cutter element supported on said holding means for performing a machining operation during insertional movement of the clamping bar into a hole in a work piece; a second cutter element supported on said holding means for performing a machining operation during return movement of the bar out of the work piece; said second cutter element being adjustably mounted for movement toward or away from the clamping bar longitudinal axis; and means coaxial with said bar for adjusting the position of said second cutter element when the bar is at the limit of its insertional movement into the work piece, said adjusting means comprised of an axially movable slide element mounted in said cutter means, and an actuator rod extending within said clamping bar; said actuator rod having a releasable connection with said slide element comprised of a transverse slot in the slide and a mating detent on the actuator rod; said actuator rod being rotatable to release said detent from said slot whereby the cutter holding means can be separated from the clamping bar.

2. The boring tool of claim 1, wherein said adjusting means further comprises a radially movable force transmitter element extending between said slide element and said second cutter element.

3. The boring tool of claim 2, wherein said slide element has a cam connection with said force transmitter element, whereby axial motion of the slide element produces radial motion of the force transmitter element.

4. The boring tool of claim 2, wherein said second cutter element comprises a resilient arm structure attached to said cutter holding means and a cutter head carried by said resilient arm structure; said resilient arm structure being effective to normally bias said cutter body toward the clamping bar longitudinal axis; said force transmitter element being effective to overcome the biasing action of said resilient arm structure for moving said cutter head away from the bar longitudinal axis.

5. The boring tool of claim 1, wherein said actuator rod has a screw-type connection with said clamping bar.

6. The boring tool of claim 5, wherein said screw-type connection comprises a pin extending transversely through said actuator rod, and a helical slot in said clamping bar.

7. The boring tool of claim 6, wherein said clamping bar is tubular, and said actuator rod has a circular cross section rotatably fitting within the tubular bar.

8. The boring tool of claim 6, wherein said helical slot is directed so that rotation of the bar during a machining operative is effective to tighten the connection between the actuator rod and the slide element.

9. A boring tool comprising a housing having a longitudinal axis, an end face transverse to said axis, and a longitudinal cavity extending axially from said end face; a cutter holding means movable into and out of said cavity; a rotary tubular clamping bar located on the longitudinal axis of said housing for releasably clamping said cutter holding means to said housing; a first cutter element supported on said holding means for performing a machining operation during insertional movement of said cutter holding means into a hole in a work piece; a second cutter element supported on said holding means for performing a machining operation during return movement of said cutter holding means out of the work piece; said second cutter element being adjustably mounted for movement toward or away from the clamping bar longitudinal axis; and means coaxial with said clamping bar for adjusting said second cutter element away from the bar longitudinal axis when the bar is at the limit of its insertional movement into the work piece, said adjusting means comprised of an axially movable side element mounted in said cutter holding means; and a radially movable force transmitter element extending between said slide element and said second cutter element, said releasable connection comprised of a transverse slot in the slide element, and a mating detent on the actuator rod; said actuator rod being rotatable to form a break or releasable connection with said slide element whereby the cutter holding means can be separated from the clamping bar.

10. The boring tool of claim 9, wherein said tubular clamping bar has a helical slot therein, and said actuator rod has a transversely extending pin fitting within said helical slot, whereby rotary motion of said rod enables the rod to move axially so as to effect movement of said slide element.

* * * * *